United States Patent [19]

Stevenson et al.

[11] Patent Number: 5,866,091
[45] Date of Patent: Feb. 2, 1999

[54] METHOD FOR MINIMIZING HYDROGEN HALIDE CORROSION IN A PARTIAL OXIDATION PROCESS

[75] Inventors: John Saunders Stevenson, Yorba Linda, Calif.; Byron Von Klock, Beaumont, Tex.; John Duckett Winter, Yorba Linda, Calif.; Jerrold Samuel Kassman, League City, Tex.; George Henry Webster, Jr., Willis, Tex.; Paul Ellis Brickhouse, Houston, Tex.

[73] Assignee: Texaco Inc, White Plains, N.Y.

[21] Appl. No.: 890,459

[22] Filed: Jul. 9, 1997

Related U.S. Application Data

[60] Provisional application Nos. 60/021,882, 60/021,886, 60/021,881 Jul. 17, 1996.
[51] Int. Cl.$^6$ .............................. C01B 7/00; C07C 1/02
[52] U.S. Cl. ..................................... 423/240 R; 252/373
[58] Field of Search ........................ 252/373; 423/240 R

[56] References Cited

U.S. PATENT DOCUMENTS

| | | | |
|---|---|---|---|
| 4,468,376 | 8/1984 | Suggitt | 423/358 |
| 5,401,282 | 3/1995 | Leininger | 48/197 R |
| 5,611,963 | 3/1997 | Unger | 252/373 |

*Primary Examiner*—Paul J. Killos
*Assistant Examiner*—Jafar Parsa
*Attorney, Agent, or Firm*—Henry H. Gibson; Rodman & Rodman

[57] ABSTRACT

The present invention relates to a method for minimizing hydrogen halide corrosion in quench gasifier during the non-catalytic partial oxidation reaction of a halogen-containing hydrocarbonaceous feed, to produce a hydrogen halide-containing synthesis gas, finely divided particulate solids, and a nontoxic slag. The hydrogen halide-containing synthesis gas is contacted with water in the quench zone of the gasifier. The quench water contains a neutralizing agent, in excess of the amount necessary to neutralize hydrogen halide acids present therein, to thereby form halide salts. The quench water containing the halide salts is purified to recover the halide salts. The salt-free water is essentially environmentally non-toxic and can either be recycled to the process or discarded in conformity with environmental regulations.

9 Claims, 1 Drawing Sheet

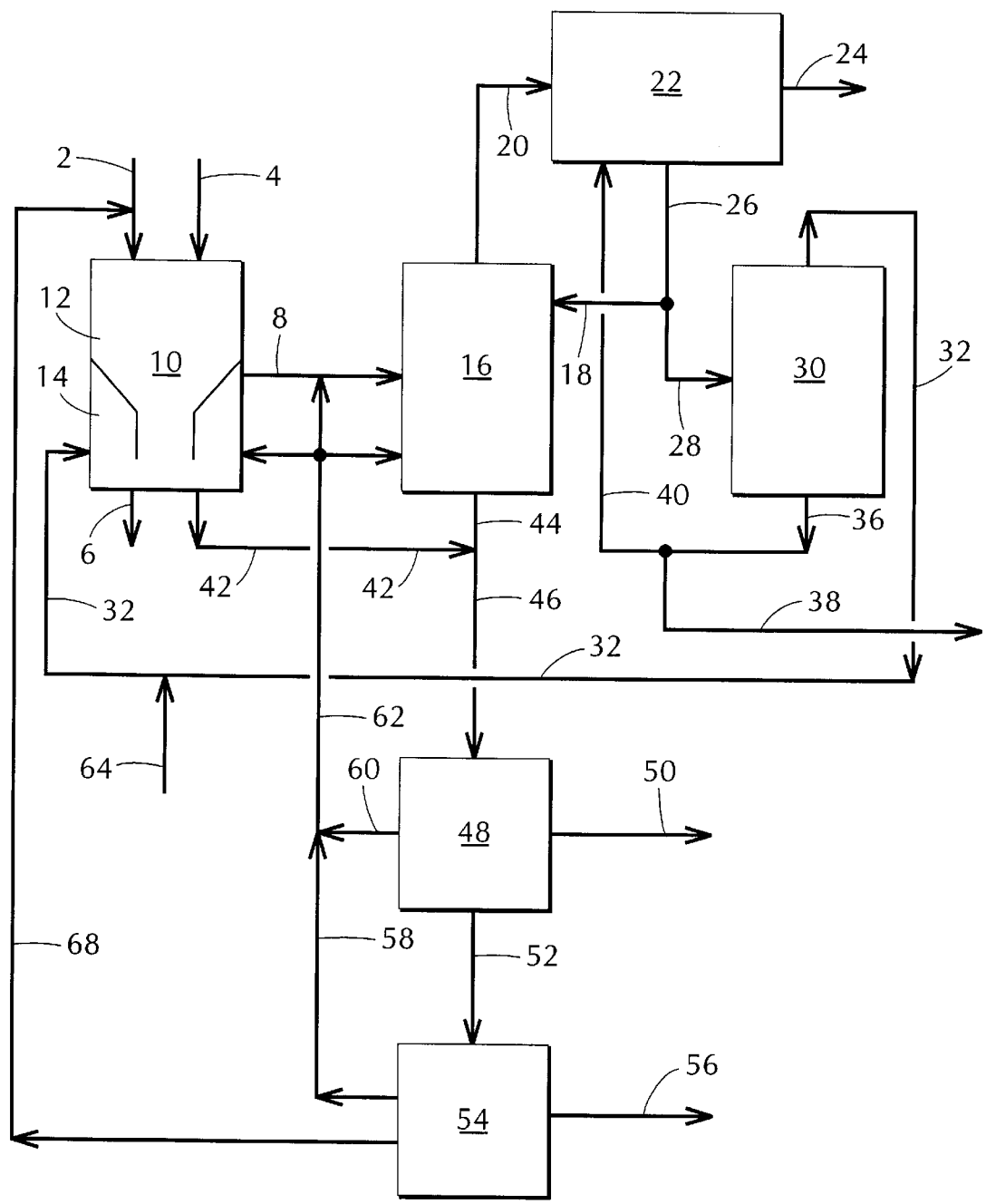

METHOD FOR MINIMIZING HYDROGEN HALIDE CORROSION IN A PARTIAL OXIDATION PROCESS

This application claims the benefit of U.S. Provisional Application Nos. 60/021,880; 60/021,882; 60/021,886; 60/021,881 and 60/021,891 all filed Jul. 17, 1996.

BACKGROUND OF THE INVENTION

1. Field of the Invention

This invention relates to a method for minimizing hydrogen halide corrosion in a partial oxidation, entrained flow, quench gasifier.

2. Description of the Prior Art

Petroleum, coal and other organic natural resources are used as fuels, for transportation, heating and power generation, and also as feedstocks to partial oxidation gasifiers for the manufacture of various industrial chemicals. This includes gaseous, liquid and solid hydrocarbons. Almost any combustible material having carbon and hydrogen can serve as a feedstock for the partial oxidation gasification process, such as natural gas, methane, crude oil, shale oil, bitumen, heavy residual oil, coal, petroleum coke, sewage sludge, light hydrocarbon fuel, various coals including anthracite, bituminous, sub-bituminous and lignite, and various mixtures of the above. Also useful as feedstocks for the partial oxidation gasification process are various mixtures and slurries of the above, using among other things, hydrocarbons or other gaseous or liquid materials to form a pumpable slurry.

Diminishing natural resources as well as economic considerations have led to the increasing use of organic feedstocks from impure sources, such as scrap or waste plastic materials which contain relatively high levels of contaminants.

The scrap plastic is used as a hydrocarbonaceous feedstock in a partial oxidation reaction to produce mixtures of hydrogen and carbon monoxide, referred to as synthesis gas, or simply "syngas." Syngas can be used to make other useful organic compounds or as a fuel to produce power.

Waste or scrap plastic materials often comprise at least one solid carbonaceous thermoplastic and/or thermosetting material which may or may not contain associated inorganic matter, such as fillers and reinforcement material. Such materials may be derived from obsolete equipment, household containers, packaging, industrial sources, recycling centers and discarded automobiles. Scrap plastic comprises solid organic polymers derived from sheets, films, extruded shapes, moldings, reinforced plastics, laminates and foamed plastics. The mixture of scrap plastics varies with the source and with the presence of non-combustible inorganic matter incorporated in the plastic as fillers, catalysts, pigments and reinforcing agents.

Inorganic matter may also include dyes and pigments such as compounds of cadmium, chromium, cobalt and copper; nonferrous metals such as aluminum and copper in plastic coated wire cuttings; metal films; woven and non-woven fiber glass, graphite, and boron reinforcing agents; steel, brass, and nickel metal inserts; and lead compounds from plastic automotive batteries. Heavy metals, for example cadmium, arsenic, barium, chromium, selenium, and mercury may also be present. The inorganic constituents may be present in the solid hydrocarbonaceous plastic-containing material in an amount ranging from about a trace to about 30 weight percent of such plastic-containing material.

Solid hydrocarbonaceous plastic waste typically consists of polyethylene, polyethylene terephthalate, polypropylene, polyesters, polyurethanes, polyamides, polyvinylchloride, polystyrene, cellulose acetate and mixtures thereof. Also found are polyurea, polycarbonates, cellulose, acrylonitrile-butadiene-styrene (ABS), acrylics, alkyds, epoxy resins, nylon, phenolic plastics, polyacetals, polyphenylene based alloys, styrene, acrylonitrile, thermoplastic elastomers, fluoride polymers, rubber stocks, urea and melamine.

Because of the reducing conditions which exist during the partial oxidation reaction, the halogen content of the halogenated organic material is converted to hydrogen halide or ammonium halide. Free halogens which can be formed during the complete combustion of halogenated organic materials are not formed under the conditions in the partial oxidation gas reactor. Other halogen compounds such as phosgene ($COCl_2$), cyanogen chloride ($CNCl$), volatile halide compounds such as $AlCl_3$, $Cl_4$ and $POCl_3$ are not formed during the partial oxidation reaction even though aluminum, vanadium or phosphorus may be present in the feedstock.

A quench gasifier is used to conduct partial oxidation reactions and to capture most of the acid component of the syngas in the quench water. The partial oxidation reaction is carried out in a free-flow unpacked noncatalytic quench gasifier. The reaction temperature is about 1800° F. to about 3000° F. and the reaction pressure is about 1 to about 100 atmospheres, preferably about 25 to about 80 atmospheres. Under such high temperatures and pressures, substantially all halogenated organic materials are rapidly converted into hydrogen halides, carbon dioxide, carbon monoxide, hydrogen cyanide, ammonia, carbonyl sulfide, hydrogen and trace amounts of other gases and small quantities of carbon.

The presence of halogens in scrap plastic may range from trace amounts to as much as 10 weight % or more, and can cause severe corrosion problems. During the non-catalytic partial oxidation reactions, the halogen content of the scrap plastic hydrocarbonaceous feeds is primarily converted to hydrogen halides. At high temperatures, these acidic halides make heat recovery from the resultant syngas impractical because of corrosion problems prior to removal of the acidic component. This problem is compounded when the halogen content is highly variable and cannot be easily measured, as is the case with any waste material, particularly plastics, thereby making implementation of corrective countermeasures very difficult.

The extent of corrosion in the quench portion of the reactor and in downstream equipment can be reduced by adding a base to control the pH. A second problem arises from the variable nature of the halide content of the feed. If the pH in the water system becomes too high, depending on the base used, salts can precipitate in parts of the process water system causing blockage and/or obstruction. It is difficult to control the addition rate of base to match the halide feed rate because pH control of hot, pressurized process water or feedforward control based on halide analysis of the feed is unreliable.

In the gasification of well defined feedstocks containing low amounts of halides, on the order of about 0.05 weight % to about 2 weight %, the addition of a base to neutralize the acidic halide content of gasification water streams is based on stoichiometric amounts of the base for the average amount of acid produced in the gasifier. Since the buffering capacity of the process water is typically greater than variations in the acid generating components in the feed, the pH of the process water can be measured offline and addition rates of base adjusted as needed. However, when the amount of halides in the feed can far exceed the natural buffering capacity of the process water, and where this amount can change rapidly, such a system cannot prevent severe corrosion. This can occur when there is at least about 0.5 weight % halide in the feed, and normal or low amounts of nitrogen or alkali metals in the feed, where "normal" is defined as those amounts typically found in oil residuum, coal or petroleum coke.

U.S. Pat. No. 4,468,376 to Suggitt discloses a method for disposing of fixed amounts of halogenated organic material produced during a partial oxidation reaction. For example, the quench zone of the gasifier is maintained at a pH above 7 with ammonia to ensure that there is a sufficient amount of ammonia to react with the hydrogen halide in the synthesis gas stream. Thus, the Suggitt patent discloses how to prevent contamination of synthesis gas with acid, but does not disclose how to prevent corrosion in the process water system. The Suggitt patent does not explain how to control ammonia addition when the feedstock to the gasifier contains variable amounts of halide, which is the situation encountered when using waste plastic materials as the feedstock.

If an excessive amount of ammonia or other equivalent base is added to the quench water so that the pH rises above about 10, solid ammonium carbonate salts will precipitate as a result of the reaction of $NH_3$ or the cationic portion of another equivalent base with dissolved carbon dioxide in any water contacted with or condensed from the syngas. This can cause plugging problems in the water system used in the gasification operation, particularly the heat exchangers used to cool the syngas from the quench and scrubber temperatures of about 350° F. to about 600° F., to temperatures of about 80° F. to about 300° F., for further cleanup or processing.

Alternatively, if the amount of ammonia or other equivalent base is insufficient to react with all the hydrogen halide in the synthesis gas stream, rapid and catastrophic acid corrosion of materials of construction, such as carbon steel, can occur.

Furthermore, the presence of ammonia or any volatile base contaminates the synthesis gas product. Therefore the process has to be adapted to remove the neutralizing base from the synthesis gas and to recover or dispose of any excess base.

If one skilled in the art followed the teachings of the Suggitt patent, it could lead to large amounts of excess water or plugging and blockage in parts of the water system used in the partial oxidation reaction system. The Suggitt patent also does not disclose specific means to assure that ammonia is always in excess, particularly for those feeds where the halide content varies widely. Thus, the Suggitt patent does not disclose how pH control with ammonia can be implemented, or how to deal with feedstocks containing a variable halogen content. In essence, the Suggitt patent does not disclose how to control pH or corrosion as the halide content of the feed varies, nor does it address the problem of ammonia contamination in the synthesis gas.

When gasifying a feed with high and variable chloride content on the order of about 10 weight % to about 15 weight %, where ammonia addition is based on periodic off-line sample analyses, for example, every 30 minutes, a sudden increase in the chloride content of the feed caused the quench water pH to drop below 1 in less than 15 minutes. Failure was experienced in a carbon steel component of the process water piping due to corrosion which caused a hole in the line. The time required for the pH to decrease to dangerous levels, if ammonia addition is interrupted or inadequate, can be less than 30 minutes in a gasifier with more than 2 weight % chloride in the feed. This can cause rapid corrosion of any carbon steel component, and can result in the release of pressurized hot gas or water.

In similar circumstances to those cited above, difficulties in adjusting the output of the ammonia addition pump caused the ammonia addition rate to be roughly twice the required amount for neutralization. This caused rapid plugging of the synthesis coolers in less than one hour, resulting in shutdown of the reactors.

SUMMARY OF THE INVENTION

The present invention relates to a method for minimizing hydrogen halide corrosion in a quench gasifier during the non-catalytic partial oxidation reaction of a variable halide content hydrocarbonaceous feed, to produce a hydrogen halide-containing synthesis gas or "syngas." The hydrogen halide-containing synthesis gas is contacted with quench water in the quench zone of the gasifier which contains a neutralizing agent that is in excess of the stoichiometric amount necessary to neutralize hydrogen halide acid gases contained in the synthesis gas. The neutralized hydrogen halide gases form condensed halide salts in the quench water. The halide salts can be purified for further use. A portion of the quench water containing the halide salts is removed and treated to recover the halide salts. The treated quench water can be either be recycled to the process or discarded in conformity with environmental regulations.

BRIEF DESCRIPTION OF THE DRAWING

The accompanying drawing is a simplified diagrammatic representation of the operative steps for minimizing hydrogen halide corrosion when a variable halide content hydrocarbonaceous feedstock undergoes partial oxidation.

DESCRIPTION OF THE PREFERRED EMBODIMENTS

In accordance with the present invention, corrosion control is provided in the gasifier quench water process system, and the synthesis gas scrubbing and cooling operations of the gasification system by adding a stoichiometric excess of neutralizing agent, such as ammonia to the water being circulated in the quench zone of the gasifier, so that there is always more than enough neutralizing agent in the quench water to neutralize the hydrogen halide acids present in the synthesis gas. The amount added is chosen to ensure that the pH of the quench water exiting the quench zone of the gasifier is always in the range of about 3.5 to about 9.0. This is because at lower pH, rapid and catastrophic corrosion can occur, whereas at higher pH, plugging of the cooling system by ammonium carbonate can occur.

The inventive process is designed to provide an ammonia content that is always in stoichiometric excess of the maximum expected amount of halide, and low enough so that ammonium carbonate does not precipitate in the gasification process system, more specifically, the syngas coolers.

While acid gases such as carbon dioxide, hydrogen sulfide and hydrogen cyanide are formed during the partial oxidation reaction, the quench cooling of the synthesis gas and the subsequent water scrubbing causes the gaseous hydrogen halide to preferentially react with the ammonia. Formate ions ($HCOO^-$) are formed in the quench water, and since they are not volatile, remain in the water. Some carbon dioxide and hydrogen sulfide gases solubilize in the water, but most remain in the gaseous state. Since the hydrogen halides and ammonia are very soluble, all of the halides will be absorbed in the water. If there is excess ammonia in the water, ionization will occur to form chloride (Cl$^-$) and ammonium (NH$_4^+$) ions in solution.

The hydrogen halide containing synthesis gas is passed from the reaction zone of the gasifier into the quench zone where it is contacted with quench water containing the neutralizing agent that is always in stoichiometric excess of the minimum amount needed to neutralize the hydrogen halide acids present in the synthesis gas, to thereby form corresponding halide salts in the quench water. The substantially halogen-free synthesis gas is then passed to a scrubbing operation where the synthesis gas is scrubbed with water to remove any entrained finely divided particulate solids.

The neutralizing agent is preferably added in an amount such that the quench water exiting the gasifier quench zone is at a pH of about 3.5 to about 9.0 preferably about 4.5 to about 8.5. The scrubbing water exiting the scrubber is also maintained at a pH of about 3.5 to about 9.0 preferably about 4.5 to about 8.5. Below a pH of 3.5 catastrophic and rapid corrosion from halides can occur. Above a pH of 9.0, plugging of the cooling system by ammonium carbonate can occur.

The use of a volatile base such as ammonia as the neutralizing agent is preferred because the vapor spaces in the quench chamber, scrubber, and the heat exchangers used to cool the synthesis gas cannot otherwise be adequately protected. This is due to the volatility of halogen acids. When a non-volatile base is used, acidic condensates can occur. However, when a volatile and highly soluble base such as ammonia is used, there will always be ammonia present in both the liquid and vapor phase if it is present in either phase in an amount in excess of the halides.

Since the stoichiometric quantity of the neutralizing agent is always greater than the amount of halide in the hydrocarbonaceous feedstock, there will always be sufficient base present in the liquid phase to prevent excessive corrosion. This results in the formation of ammonium chloride with an excess of ammonia, rather than an excess of hydrogen chloride, and assures that there will be little or no acidic condensate, and a non-corrosive pH of about 6 to about 10.5 will exist in any condensates. Thus, any condensate from the synthesis gas exiting the quench portion of the gasifier will consequently be non-corrosive.

To remove the halides from the gasification system, an aqueous halide-containing stream is purged or removed so that the halide content of the hydrocarbonaceous feed can be discharged from the overall process. This is done in a purification step wherein the halide salts are recovered for further use or disposed of in accordance with environmental standards. All or a portion of the purified water can be returned to the process, as needed, or disposed. As a secondary consideration, it is generally desirable to minimize the amount of water added to or removed from the overall gasification process water system. The composition of the hydrocarbonaceous feed controls whether water is made or consumed during the gasification process.

Referring to the FIGURE, a halogen containing hydrocarbonaceous feedstock 2, and any water needed or associated with the feedstock, and a free oxygen containing gas stream 4 are fed to the reaction zone 12 of the quench gasifier 10. Therein, the feedstock undergoes partial oxidation to form a raw syngas and a slag by-product which passes to the quench zone 14 of the gasifier 10. The syngas and slag are contacted in the quench zone 14 with quench water 32 containing a neutralizing agent such as ammonia in excess of the stoichiometric amount necessary to neutralize the maximum expected halide content of stream 2. Nontoxic slag 6 exits the quench zone 14 to disposal or for use as a building material.

The substantially halogen-free syngas stream 8 with excess ammonia exits the quench zone 14 and enters the scrubber 16 where it is contacted with scrubbing water 18, which removes finely divided entrained particulate solid material. Clean syngas stream 20 saturated with water vapor at the operating pressure of the system and containing the excess ammonia in the gas stream that is at or near equilibrium with the amount of ammonia in the water, exits scrubber 16 and enters the cooler 22 wherein the water vapor and ammonia are condensed by being cooled to a temperature below the dew point. A clean, dry syngas stream 24 containing substantially no hydrogen halide and only trace amounts of ammonia exits the cooler 22 for further use. Condensed water stream 26 with ammonia exits cooler 22 and is divided into streams 18 and 28.

Ammonia-containing water stream 18 is fed to the scrubber 16 to serve as the scrubbing medium for the synthesis gas stream 8. Ammonia-containing water stream 28 enters ammonia stripper 30, and exits as ammonia-rich water stream 32 and ammonia-lean water stream 36. The ammonia-rich water stream 32, also referred to as the "stripper overhead" is combined with additional ammonia from stream 64, as needed, to provide sufficient ammonia in excess of the stoichiometric amount needed to neutralize the maximum expected halide content of the hydrocarbonaceous feedstock 2.

The ammonia-lean water stream 36 exiting the ammonia stripper 30 is divided into ammonia-lean water streams 38 and 40. Ammonia-lean water stream 38 can be discharged if local regulations permit or it can be subjected to additional waste water purification treatment if needed prior to disposal. Ammonia-lean water stream 40 is fed to the cooler 22 to condense the water vapor and ammonia from the syngas. Alternately, all or a portion of water stream 38 can be recycled to the quench zone 14 or to the scrubber 16, or a portion to both.

Since carbon dioxide is present in the synthesis gas at much higher concentrations than ammonia at the conditions in cooler 22, carbon dioxide is essentially equimolar to ammonia and is also absorbed in stream 26. Thus, excess ammonia in stream 20 has to be limited to the solubility limit of ammonium carbonate in stream 26, thus the maximum pH of 9.0 in stream 44.

Quench water 42 at a pH of about 3.5 to 9.0 exits the quench zone 14 of the gasifier 10 and contains the neutralized halide salts condensed from the syngas. Quench water stream 42 is combined with the scrubbing water stream 44 which exits the scrubber 16 at a pH of about 3.5 to 9.0 to form the combined water stream 46 which is laden with the particulate matter removed from the syngas and the halide salts which have been neutralized and condensed from the acid halide vapors that were present in the syngas. The halide salts are generally primarily chloride salts.

The water stream 46 enters the separator 48 wherein particulate solids comprising carbon, ash and some precipitated salts are separated and exit as stream 50 for further treatment and disposal in accordance with environmental regulations. The particulate-free halide salt rich water stream containing dissolved halide salts exits the separator 48 as stream 52 and enters the purifier 54 wherein the halide salts 56 are separated and recovered for further use, including commercialization.

A portion of the halide salt-free water 58 exits the purifier 54 and is combined with the particulate-free water stream 60 which exits from the separator 48 to form combined water stream 62. All or a part of the water stream 62 can be recycled to the quench zone 14 of the gasifier 10. Alternatively, all or a part of water stream 62 can be recycled to the scrubber 16 to serve as an additional source of scrubbing water. Lastly, all or a part of water stream 62 can be introduced into the raw syngas stream 8 to enhance the scrubbing operation before the syngas enters the scrubber 16.

Water stream 68 exits the purifier 54 to contact the halogen-containing hydrocarbonaceous feedstock 2 entering the gasifier 10 wherein it serves as a temperature moderator in the reaction zone 12.

Ammonia in excess of the actual amount needed to neutralize the halide content present in the hydrocarbonaceous feedstock 2 eventually accumulates in stream 68 which is combined with feedstock 2 or introduced separately in reaction zone 12, where the ammonia is substantially destroyed by decomposition. Thus, excess ammonia can be fed to the reaction zone 12 of the gasifier 10 without accumulating excess ammonia in the product synthesis gas and eliminating the need for unreliable pH control.

It has been found that by controlling the amount of neutralizing agent added to the quench water so that it is always in stoichiometric excess of the maximum halide content of the hydrocarbonaceous feedstock 2, and by controlling the amount of water in stream 28 entering the ammonia stripper 30, and controlling the amount if water in stream 52 entering the purifier 54, and determining whether enough water is removed in stream 38 exiting the system to require the addition of water to the system, and if water is added, selecting where the water is to be added, conditions can be found such that the pH of the quench water and the scrubber water remains in the non-corrosive range of about 3.5 to about 9.0, and the solubility limit of ammonium carbonate is not exceeded in the synthesis gas coolers or other parts of the gasification water system, except where halide salts are intentionally precipitated in purifier 54.

This is done by taking into consideration the synthesis gas and water flows throughout the system, operating temperatures and pressures, the concentration of soluble species, such as the neutralizer, halides, and carbon dioxide, and the known equilibrium behavior of these species, that is, ionization constants, and vapor pressure versus liquid concentrations, and conducting mathematical simulation of the entire system. Such process modeling is well known to those skilled in the art and simulates process conditions for maximum and minimum hydrogen halide protection from a variable halide hydrocarbonaceous feedstock.

The process conditions are derived from the aforementioned criteria through commercially available simulation packages or a simulation program can be prepared directly from the known equilibrium relationships. In this manner, the process can be controlled so that at the maximum halide content expected from the hydrocarbonaceous feed, the pH of the quench water exiting the quench zone of the gasifier and exiting the scrubbing zone will be greater than 3.5, and at the minimum halide content the pH will be less than 9.0. This eliminates the need for unreliable on-line pH control loops.

The halogen content of the total hydrocarbonaceous feedstock to the gasifier can vary from about 0.05% to about 15 weight %, preferably about 0.1 weight % to about 10 weight % and most preferably about 0.2 weight % to about 5 weight % of the total feed to the reaction zone.

The synthesis gas is contacted with quench water, having ammonia dissolved therein to neutralize and condense the hydrogen halide into the quench water. The quantity of ammonia in the quench water is in excess of the stoichiometric amount necessary to completely neutralize the hydrogen halide and other acids which condense in the quench water.

While ammonia or an ammonium salt are the preferred neutralizing agents, any suitable equivalent neutralizing agent can also be used. Such neutralizing agents include alkali metal salts, alkaline earth metal salts, a natural or synthetic mineral or ore containing the aforesaid neutralizing agents, and mixtures thereof.

The feedwater to the quench zone and the scrubber is generally at a pH of about 7 to about 10. The pH in the quench zone 14 and quench water exit stream 42 are maintained at the desired range by the addition of liquid or gaseous ammonia in stream 64 at the calculated amount needed. In another embodiment, the quench and scrubbing water can be maintained at the desired pH level by saturating the feed water with a solid ammonium salt such as ammonium carbonate or ammonium bicarbonate. Saturated solutions of these neutralizing agents are essential at a given pH to ensure that the ammonia concentration will be sufficient to neutralize any amount of chloride in the feed without on-line pH measurements or feedback control.

Nitrogen can comprise part of the hydrocarbonaceous feed. Typically about 10 weight % to about 25 weight % of the nitrogen in the hydrocarbonaceous feed is converted into ammonia, and about 0.1% to about 1.5% by weight is converted into hydrogen cyanide (HCN), with the remainder forming molecular nitrogen ($N_2$), which becomes part of the synthesis gas. Additional treatment of the residual ammonia is not required and discharge to the atmosphere is avoided, because excess ammonia is recycled to the gasifier and it is converted to nitrogen and hydrogen, thereby preventing plugging and precipitation of ammonium carbonate in the system and contamination of the synthesis gas product with ammonia.

The water blowdown stream 28 is concentrated in the ammonia stripper 30 to a high concentration ammonia stream 32 which is fed to the gasifier quench zone 14, and a low concentration ammonia-water stream 36 which can be recycled to the gas cooler 22. The low concentration ammonia-water stream recycled to the gas coolers helps prevent salt precipitation and lowers the ammonia concentration of the syngas. A portion of bleed stream 38 can be recycled to scrubber 16, or discarded in accordance with environmental standards.

Preferably, the minimum ammonia addition rate to quench zone 14 is such that the pH of the water stream 42 exiting the quench zone or quench chamber of the gasifier is greater than 3.5 at the maximum halide concentration in the feed. Under these conditions, vapors which condense after exiting the quench zone will also have a pH greater than 3.5. This property dictates the preferred choice of ammonia as the hydrogen halide neutralizing agent. If a nonvolatile base is used, there would be no base in the synthesis gas when it is cooled. The condensate in the coolers can then be acidic due to any low concentration of volatile or entrained acids, and the carbon dioxide in the synthesis gas.

The benefit of this invention is that halide corrosion is substantially reduced or eliminated and less expensive materials of construction can be used to conduct the process. An environmentally "clean" water can be generated and plugging of the water system due to carbonate precipitation is avoided.

Although this invention has been described in the context of using ammonia as the preferred base, other equivalent or suitable bases can also be used.

We claim:

1. A method for minimizing hydrogen halide corrosion in an operating system for the production and purification of synthesis gas, wherein said operating system comprises a quench gasifier with a reaction zone and a quench zone, a scrubbing zone, and a purification zone, comprising:

(a) reacting a variable halogen-content hydrocarbonaceous feed in a non-catalytic partial oxidation reaction to produce a synthesis gas containing hydrogen, carbon monoxide, hydrogen halide vapors, water, and carbon dioxide;

(b) passing the hydrogen halide-containing synthesis gas from the reaction zone into the quench zone and contacting said synthesis gas with quench water containing an ammoniacal neutralizing agent to neutralize the hydrogen halide vapors and form condensed ammonium halide salts in the quench water, wherein the amount of neutralizing agent contained in the quench water is maintained in stoichiometric excess of the maximum amount of halide in the hydrocarbonaceous feed by the addition of sufficient amounts of ammonia or an ammonium salt, and the pH of the ammonium halide salt-containing quench water exiting the quench zone is maintained at about 3.5 to 9.0 by the addition of sufficient amounts of ammonia or an ammonium salt, and the synthesis gas exiting the quench zone is substantially halide-free;

(c) introducing the substantially halide-free synthesis gas into the scrubbing zone wherein it is contacted with scrubbing water to remove any finely divided entrained particulate solids, to produce a particulate-free, substantially halide-free synthesis gas, and wherein the pH of the scrubbing water exiting the scrubbing zone is about 3.5 to 9.0; and wherein excess ammonia is recycled to the gasifier where it is converted to nitrogen and hydrogen, thereby preventing plugging and precipitation of ammonium carbonate in the system;

(d) introducing the halide salt-containing quench water into the purification zone, wherein the halide salts are separated from the quench water.

2. The method of claim 1, all or a portion of purified quench water is disposed of in accordance with environmentally acceptable standards.

3. The method of claim 1, wherein all or a portion of purified quench water is recycled to the gasifier quench zone.

4. The method of claim 1, wherein all or a portion of the purified quench water is recycled to the gasifier reaction zone.

5. The method of claim 1, wherein the substantially halide-free synthesis gas exiting the scrubbing zone is introduced into a cooling zone to condense water vapor and ammonia from the synthesis gas to form an ammonia-containing water stream and a clean synthesis gas product, and wherein there is sufficient water in the cooling zone to prevent the precipitation of ammonium carbonate in the ammonia-containing water stream.

6. The method of claim 5, wherein the ammonia-containing water stream is introduced to an ammonia stripping zone wherein an ammonia-rich water stream and an ammonia-lean water stream are produced.

7. The method of claim 6, wherein all or a portion of the ammonia-rich water stream is recycled to the gasifier quench zone.

8. The method of claim 6, wherein all or a portion of the ammonia-lean water stream is recycled to the cooling zone.

9. The method of claim 1, wherein the neutralizing agent is ammonia.

* * * * *